United States Patent [19]

Anderson

[11] 4,442,629
[45] Apr. 17, 1984

[54] EASILY ASSEMBLED COMBINATION FLOWER POT AND TRAY

[75] Inventor: Dennis C. Anderson, Northfield, Minn.

[73] Assignee: National Polymers Inc., Lakeville, Minn.

[21] Appl. No.: 395,681

[22] Filed: Jul. 6, 1982

[51] Int. Cl.³ .............................................. A01G 9/02
[52] U.S. Cl. ............................................ 47/71; 47/67
[58] Field of Search .............................. 47/66, 67, 71; 24/208 R, 214; 248/346.1

[56] References Cited

U.S. PATENT DOCUMENTS

| | | | |
|---|---|---|---|
| 691,308 | 1/1902 | Devine | 24/214 |
| 2,813,712 | 11/1957 | Stanis | 24/214 |
| 3,094,757 | 6/1963 | Blake | 24/214 |
| 3,107,028 | 10/1963 | DeRobertis | 47/71 |
| 3,631,627 | 1/1972 | Van Zijverden | 47/66 |
| 3,965,616 | 6/1976 | Ridgeway | 47/66 |
| 3,990,179 | 11/1976 | Johnson et al. | 47/67 |

FOREIGN PATENT DOCUMENTS

43812/64 10/1965 Australia .................... 47/38.1

Primary Examiner—Robert A. Hafer
Assistant Examiner—Bradley M. Lewis
Attorney, Agent, or Firm—James V. Harmon

[57] ABSTRACT

A combination flower pot and tray is described which can be quickly assembled without visually orienting the tray with respect to the pot. It includes a lug located at the center of the tray and extending upwardly therefrom and adapted to snap fit into an opening in the bottom of the pot. Three provisions are made for helping to orient or locate the tray with respect to the pot including side walls on the tray which conform generally to adjacent side walls on the pot, a cylindrical skirt on the bottom of the pot which fits telescopically into a mating wall between the side and bottom walls of the tray and a blunt conical point at the top of the lug to help guide it into the opening.

16 Claims, 7 Drawing Figures

U.S. Patent     Apr. 17, 1984     4,442,629
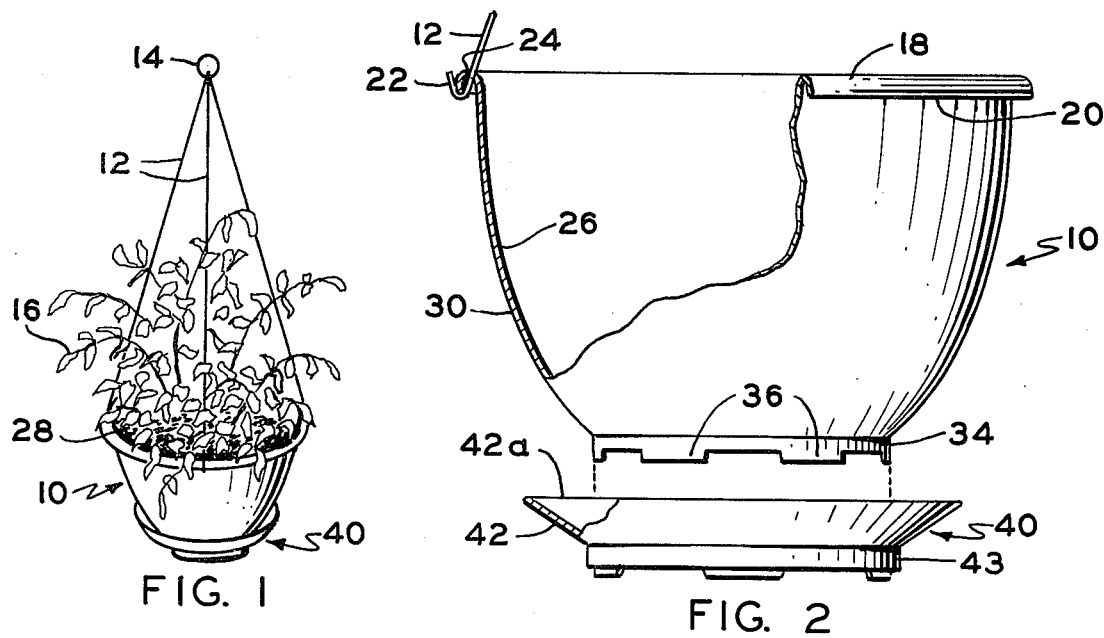
FIG. 1
FIG. 2
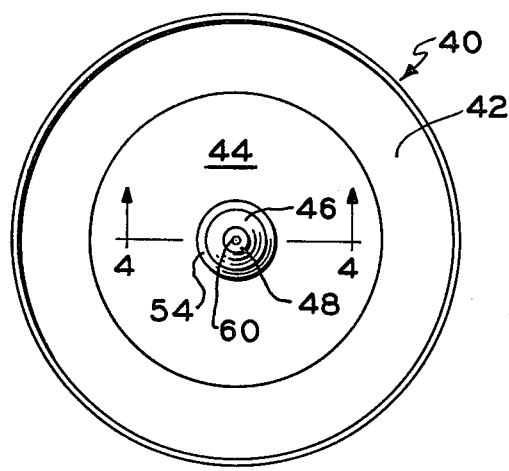
FIG. 3
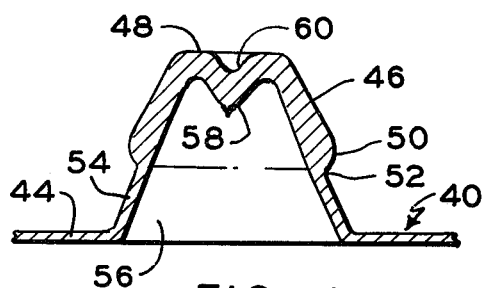
FIG. 4
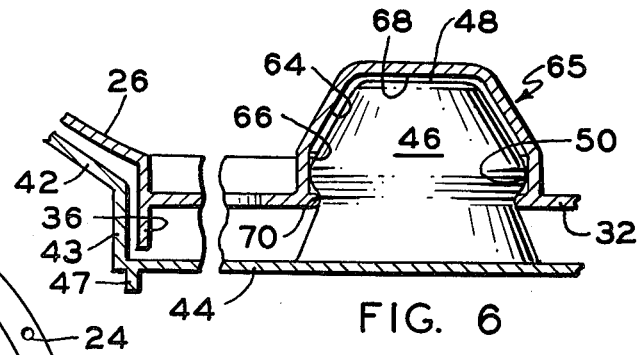
FIG. 6
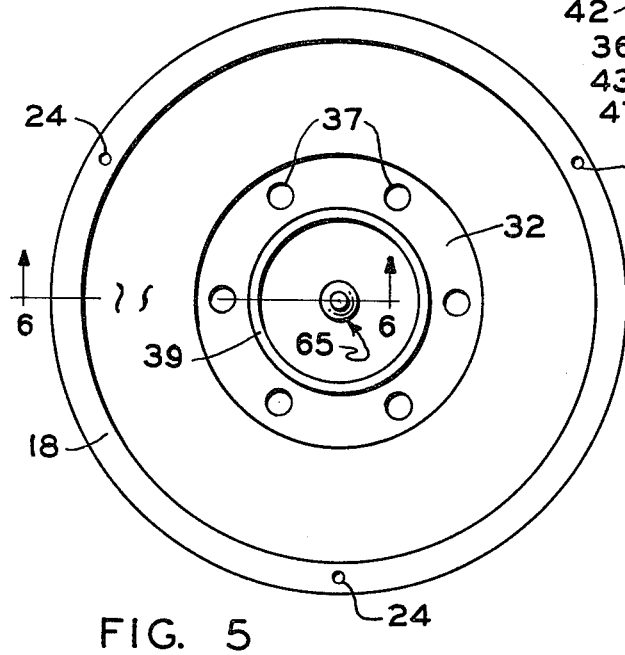
FIG. 5
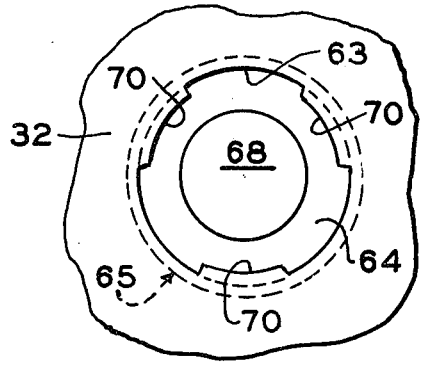
FIG. 7

4,442,629

EASILY ASSEMBLED COMBINATION FLOWER POT AND TRAY

FIELD OF THE INVENTION

The present invention relates to pots for growing plants and more particularly to a combination flower pot and water collection tray that can be assembled to form a single unit.

THE PRIOR ART

A variety of pots have been designed for growing plants. Some of these pots are provided with a tray that can be connected to its bottom surface. In one such arrangement used in the past, a pot and tray were connected together by means of five or six connecting members extending between the tray and the pot. These connecting members were arranged in a circle at the bottom of the pot in circumferentially spaced apart relationship. Many growers, nursery operators and consumers like to begin the growth of the plant without the tray in place and because the pot is filled with soil, it is difficult to see when the tray connecting members described are in alignment with those provided at the bottom of the pot. This made it necessary to readjust the position of the tray repeatedly so that the connectors of the tray and those on the pot would finally line up for assembly. This procedure is both timing consuming and frustrating. Thus, a major problem with this prior system was the impossibility of seeing and quickly uniting the connectors when the pot was filled with soil or contained a growing plant.

In addition, it is desirable to provide a design that is easy to mold and is secure, rugged in construction and economical with respect to the amount of resin used when the pot and tray are made out of thermoplastic resinous material. Another requirement is the need for provision which will help to locate the tray at the bottom of the pot prior to the last stages of assembly. Thus, if the user has difficulty in seeing where the tray fits at the bottom of the pot, the time for assembly will be increased. The more difficult it is to locate the tray at the bottom of the pot, the longer will be the assembly time. A further difficulty encountered in the development of the invention is the need for a reliable snap fit construction for retaining the parts together which can be connected and disconnected a number of times without excessive wear and which, at the same time, will allow the removal of finished parts from the molds in which they are made.

OBJECTS

In view of these and other deficiencies in the prior art, the invention has the following objects and advantages:

a. a provision for allowing the tray to be connected to the pot without visual observation through the top of the pot so that the pot can be filled with dirt before assembly, b. a provision for approximately locating or orienting the tray with respect to the pot prior to the last stages of assembly, c. a secure connecting means which is rugged in construction, sure acting and economical to produce with respect to the amount of resin used when the pot and tray are made from thermoplastic resinous material, d. a provision for draining the pot conventionally, e. an improved connection means for a pot and tray having the advantages itemized but which is also easy to mold in plastic injection molding equipment, f. an effective retaining means adapted to securely grasp a connecting lug but which at the same time can be withdrawn easily from the mold used for producing it.

SUMMARY OF THE INVENTION

The invention provides an easily and quickly assembled combination flower pot and water collection tray both formed from plastic resinous material and adapted to be connected together during use. The pot and the tray have adjacent vertically spaced apart bottom walls. One of the bottom walls is provided with a vertically extending lug located at its center. The other bottom wall is provided with a centrally located lug receiving opening having a retaining means around its edge adapted to snap fit over the lug. The lug has a blunt point at its free end and an enlarged section over which the retaining means stretches as the parts are pressed together. The lug also includes a reduced diameter groove between the enlarged section and its base into which the retaining means projects after assembly. Both the opening and the lug are of circular configuration throughout allowing the tray to be rotated with respect to the pot after assembly.

THE FIGURES

FIG. 1 is a perspective view of the invention during use.

FIG. 2 is an enlarged side elevational view partly in section with the tray positioned below the pot as it would appear just prior to assembly.

FIG. 3 is a top view of the tray on a reduced scale.

FIG. 4 is a vertical sectional view taken on line 4—4 of FIG. 3 on an enlarged scale.

FIG. 5 is a top view of the pot.

FIG. 6 is a vertical crossectional view of an enlarged scale taken on line 6—6 of FIG. 5, and Fig. 7 is a partial bottom view of the pot.

DESCRIPTION OF THE PREFERRED EMBODIMENT

Refer now to the figures and particularly FIGS. 1 and 2.

As shown in the figures, the combination pot and tray is indicated generally by the numeral 10. While the pot 11 can stand alone on the floor as will be described below, it is shown in FIG. 1 suspended from a fastener 14 by means of three wires or other suspension means the lower ends of which are secured to the pot. Within the pot 11 is a growing plant 16. The pot is filled with earth 28. At the upper edge of the pot is a rim or lip 18 which curves outwardly and downwardly at the periphery of the open mouth of the pot and has a downwardly depending edge 20 (FIG. 2). The suspension wires 12 are passed through openings 24 and each opening 24 is reinforced on each side by a fillet 22. The rim 18 strengthens the pot, provides additional rigidity and has a decorative effect. In addition, it provides a point of attachment for the suspension wires 12.

The side wall of the pot is indicated at 26. In this case, the side wall is bowl shaped or, in other words, has the shape of an inverted dome. The side wall 26 can of course have a variety of shapes as seen in crossection, including square, hexagonal, octagonal or may include radially extending ribs for decorative purposes. The outside surface 30 is preferably polished or otherwise textured to give it an attractive appearance. Both the pot 11 and the tray 40 to be described below are formed from thermoplastic resinous material and are preferably injection molded. While a variety of resins can be used, polypropylene & polyethylene will be suitable. As best seen in FIG. 2, the side wall 26 curves downwardly and centrally at the lower edge thereof such that the lowermost portion is oriented at an oblique angle with respect to the horizontal and to a bottom wall 32. At the peripheral edge of the bottom wall 32 and adjacent to the intersection between side wall 26 and bottom wall 32 is a circumferentially extending cylindrical downwardly projecting skirt 34 having a plurality of circumferentially spaced apart supporting legs 36 of equal length. The legs 36 are distributed uniformly around the circumference of the skirt 34 to provide stable support for the pot within the tray 40 or when the pot is placed on the ground and the tray is not used. The bottom wall 32 is provided with a plurality of drain holes 37 as shown in FIG. 5. Between the drain holes and the center of the bottom wall 32 is a puller ridge which, during the molding operation, extends into a puller groove in the mold (not shown). This helps the part to stay on the male part of the mold prior to the extension of a knock-out ring which kicks the part off the mold following the molding operation.

The tray 40 will now be described with particular reference to FIGS. 2-4. As shown in the figures, the tray 40 has a side wall 42 which is inclined with respect to the horizontal at approximately a 45° angle and accordingly has a generally conical surface. The inclined side wall 42 terminates in an upper open mouth 42a and its lower edge is connected to a vertical wall 43 of cylincrical configuration of just the proper size to fit telescopically over the skirt 34 when the tray is assembled at the bottom of the pot. The vertical wall 43 can best be thought of as a socket or mating wall to receive the skirt 34 which slides into it during assembly (FIG. 6). The tray 40 includes a circular bottom wall 44 and it is from the center of the bottom wall 44 that the retaining lug 46 extends upwardly. The lug 46 includes a blunt pointed free end 48 i.e., an end of reduced cross-section compared with the rest of the lug. From its upper free end, the lug 46 curves outwardly and downwardly and is generally conical in configuration, the conical portion thereof terminating in a circular enlarged section 50. Between the enlarged section 50 and the lower connected end of the lug is a circular groove or recess 52. The lower end 54 of the lug 46 is integral with the bottom wall 44 of the tray at 56. At the pointed free end of the lug is a central recess 60. Beneath it is a tip 58 corresponding to the injection gate for the part. The lug 46 is circular in crossection throughout its length. At the center of the bottom wall 32 of the pot is a lug receiving opening 63 (FIG. 7) which is covered or sealed by an integral dome comprising a cylindrical side wall wall 66, conical wall 64 and a top wall 68, all of which are integral with the pot 11. At the edge of the opening 63 are retaining means which in this case comprise three circumferentially spaced centrally extending tabs 70 are adapted to snap fit over the lug 46 at the time of assembly and extend into the groove 52 to retain the tray securely in place at the bottom of the pot 11.

Thus, during use when the tray is to be attached to the pot, the tray is easily and quickly located or oriented with respect to the bottom of the pot for rapid assembly even though there is earth in the pot. Just prior to assembly, the close proximity of the tray wall 42 and the adjacent portion of the side wall of the pot 26 immediately above it serve as a first means for orienting the tray at the bottom of the pot. The downwardly extending skirt 34 which projects toward and slides telescopically into the vertical mating wall 43 provides a second means for locating the tray. The upper blunt pointed end 48 of the lug as it enters the opening 63 provides a third means for locating the tray properly just prior to assembly. In this way, the tray can be easily positioned and quickly assembled on the pot. As this is done, the tabs and opening 63 stretch over the enlarged section 50 and snap into the groove 52. Separation and assembly can be carried out numerous times without damaging the parts. It should be noted that the enlarged section 50 has smooth rounded contours both along its upper edge and along its lower edge so that assembly and separation can be carried out smoothly. It was also discovered that the tabs 70 were able to snap out over the corresponding depressions in the male part of the mold upon which the part is formed. This makes possible the removal of parts from the mold without damage.

While three of the tabs 70 have been shown, a different number can be used. Many other variations will be apparent to those skilled in the art.

It can be seen that the single centrally located lug 46 and cooperating opening will enable the tray to be rotated about the common center axis of the tray and pot. As a result, it is much easier for growers to attach the saucer when it is full of soil. This is particularly important since some growers start the plant with the tray not attached to the pot and then secure it in place before sending the product to the market. As a result of the three separate orientation means enumerated above, the tray can be though of self-locating on the bottom of the pot prior to assembly.

Other variations in the invention will be apparent to those skilled in the art within the scope of the appended claims once the principles disclosed are understood.

What is claimed is:

1. An easily assembled combination flower pot and water collection tray both formed from semiflexible plastic resinous material comprising, a flower pot body of one piece construction having side and bottom walls, a water collection tray of one piece construction including bottom and side walls, at least one drain hole in the flower pot body to allow excess water in the pot to drain into and collect in the tray, one of said bottom walls having a lug retaining opening at the center thereof with an integral retaining means at the edge of the opening, the other of said bottom walls including a unitary centrally located vertically extending hollow lug integral with said other bottom wall and having a free end projecting in the direction of the opening in said one bottom wall, said lug having an end portion engageable within said opening and being generally conical in configuration, said free end being of reduced cross-section compared with the rest of the lug, said end portion of the lug terminating in a circular enlarged section, said lug having a base and a circular groove located between the base and the enlarged section, the free end of said lug being closed and non-deflectable and said lug having a yieldable hollow central wall region that is deflectable radially inward, said retaining means forming a releasable snap fit connection over said generally conical end portion of the lug as the central wall region and enlarged section is deflected radially inwardly when the tray is pressed toward the body of the flower pot to retain them together, said combination flower pot and tray including at least two locating means to held center the tray at the bottom of the pot including:

(a) said side wall of the tray and the side wall of the pot being positioned in proximity with respect to one another after assembly such that the proximity of the respective side walls help to center the tray on the pot during manual assembly, (b) the reduced cross-section at the free end of the lug and said conical end portion helping to guide the lug into the opening, whereby the tray can be quickly centered and properly oriented with respect to the pot for rapid assembly.

2. The combination of claim 1 wherein the retaining means at the edge of the opening comprises centrally extending circumferentially spaced apart tabs adapted to, during assembly, stretch over the outer surface of the lug and snap into place upon the lug to retain it and the tray in position on the lower end of the pot.

3. The combination of claim 1 wherein the lug has a circular crossection at all points distributed along its length and the portion thereof between the enlarged section and the free end comprises a frustoconical surface having said reduced cross-section at its free end.

4. The combination of claim 1 wherein the lug is integral with the tray and extends upwardly therefrom, said lug retaining opening is located at the center of the bottom wall of the pot whereby, after assembly, the lug extends upwardly from the tray into the opening within the lower wall of the pot.

5. The combination of claim 1 wherein a third locating means is provided, said third locating means comprising a downwardly projecting circumferentially extending skirt at the bottom of the pot and a cooperating cylindrical circumferentially extending mating wall between the side and bottom wall of the pot within which the skirt is adapted to fit telescopically to help orient the tray on the pot and guide the lug into the opening.

6. The combination of claim 1 wherein the lug is integral with the bottom wall of the tray and projects upwardly therefrom, the opening is in the bottom wall of the pot and the retaining means at the edge of the opening comprises a plurality of circumferentialy spaced apart tabs distributed around the edge of the opening adapted to stretch over and snap fit upon the lug.

7. The combination of claim 6 wherein a thin-walled dome extends over the opening to seal the same and to receive the free end of the lug, said dome comprising an integral portion of the bottom wall of the pot.

8. An easily assembled combination flower pot and water collection tray, both formed from semi-flexible plastic resinous material comprising, a flower pot body of one piece construction having side and bottom walls, said side wall being an upwardly-directed peripheral side wall at the outer periphery of the bottom wall with an upper edge defining an upwardly-open wide mouth, a water collection tray of one piece construction including a bottom and side wall, said flower pot body including at least one drain hole to allow excess water in the pot to drain into and collect in the tray, one of said bottom walls having a lug retaining opening at the center thereof with an integral centrally-directed retaining means at the edge of the opening, the other said bottom walls having a unitary vertically-extending hollow lug integral with said other bottom wall and connected at one end thereto and having a free end projecting in the direction of the opening in said one bottom wall, said lug comprising a centrally-disposed, vertically-extending, hollow core body, said lug having a hollow frustoconical head and said lug extending between said one bottom wall and said other botom wall when the tray and pot are assembled with said head being received within said opening in the other bottom wall.

said lug including a surface means thereon between said free end and an opposite end providing a perimetrically-extending circular enlarged section at the lower end of the frusto-conical head, said lug having a perimetrically-extending circular groove located between the enlarged section and the connected end of the lug, said hollow core body of the lug has a continuous non-deflectable free end and a flexible radially deflectable central wall region intermediate the ends thereof that includes the enlarged section and said central wall region and the enlarged section is deflectable radially inward at all points around its periphery, said free end of the lug being of reduced cross-section compared with the rest of the lug, the portion of the lug between the enlarged section and the free end being releasably engagable within said opening, said retaining means forming a snap-fit connection over said frustoconical portion of the lug with said retaining means snapping into the circular groove as the perimetrically extending enlarged section is deflected radially inwardly when the tray is pressed toward the body of the flower pot to retain them together, said lug and opening being structured and arranged for functioning during assembly such that the frustoconical configuration of the lug serves as a guide means for directing the lug into the opening, whereby the lug contributes to the rapid assembly of the pot and tray when the two parts are united by assisting in quick orientation of the tray and pot and the centrally-extending retaining means around the opening cooperates with the enlarged section and circular groove on the hollow conical lug to provide the sole means for anchoring the tray in place after assembly.

9. The combination flower pot and tray of claim 8 wherein the lug is formed at the center of the tray and projects upwardly therefrom, said opening comprises an opening in the bottom wall of the pot and said retaining means comprises means extending centrally from the edge of the opening in the pot.

10. The combination flower pot and tray of claim 9 wherein the lug includes two portions both of which are hollow in the center, said two portions comprising an upper hollow head portion above the enlarged section and a lower hollow portion extending from the enlarged section to the connected end of the lug, said upper hollow portion includes the free end of reduced cross-section and from said free end said upper hollow portion extends outwardly and downwardly and is generally frustoconical in configuration, said upper hollow portion terminates at its lower end in the circular enlarged section, whereby the hollow center of the lug allows all points on the periphery of the circular enlarged section to deflect centrally when being snapped into the centrally-extending retaining means around the opening in the bottom wall of the pot.

11. The combination of claim 8 wherein the pot and tray are injection molded from plastic resin, said enlarged section and the retaining means hold the pot and tray in injection molding cavities temporarily but are deflectable to permit removal thereof from the mold without damage thereto.

12. An easily assembled combination flower pot and water collection tray, both formed from semi-flexible plastic resinous material comprising, a flower pot body of one piece construction having side and bottom walls, said side wall being an upwardly-directed peripheral side wall at the outer periphery of the bottom wall with an upper edge defining an upwardly-open wide mouth, a water collection tray of one piece construction including a bottom and side wall, said flower pot body including at least one drain hole to allow excess water in the pot to drain into and collect in the tray, one of said bottom walls having a lug retaining opening at the center thereof, a closed cup-shaped integral socket around the opening composed of a thin-walled portion of the said one bottom wall and including a socket side wall closed upon itself and an end wall extending across the distal end of the socket side wall to define an end for the socket with integral centrally-directed circumferentially extending retaining means within the socket, the other said bottom walls having a unitary vertically-extending hollow lug integral with said other bottom wall and connected at one end thereto and having a free end projecting in the direction of the opening in said one bottom wall, said lug comprising a centrally-disposed, vertically-extending, hollow core body and said lug extending between said one bottom wall and said other bottom wall when the tray and pot are assembled with said free end being received within said socket in the other bottom wall, said lug including a surface means thereon between said free end and an opposite end providing a perimetrically-extending enlarged section, said lug having a perimetrically-extending portion of reduced cross-section located between the enlarged section and the connected end of the lug, said hollow core body of the lug having a flexible radially yieldable central wall region intermediate the ends thereof that includes the enlarged section, said retaining means forming a releasable snap-fit connection over said enlarged section of the lug with said retaining means snapping into the portion of the lug of reduced cross-section with the perimetrically-extending enlarged section being deflected radially inward when the tray is pressed toward the body of the flower pot to retain them together, whereby the centrally-extending retaining means around the opening cooperates with the enlarged section of the lug to anchor the tray in place after assembly.

13. The combination flower pot and tray of claim 12 wherein the lug includes two portions both of which are thin-walled and hollow in the center, said two portions comprising an upper hollow head portion above the enlarged section and a lower hollow portion extending from the enlarged section to the connected end of the lug, said upper hollow portion includes the free end of reduced cross-section and from said free end said upper hollow portion tapers outwardly toward the enlarged section, said upper hollow portion terminates at its lower end in the circular enlarged section, whereby the yieldability of the thin-walled hollow lug allows all points around the periphery of the circular enlarged section to deflect centrally when being snapped into the centrally-extending retaining means and the taper of the lug helps to orient the parts for rapid assembly.

14. The combination flower pot and tray of claim 12 wherein said retaining means is yieldable radially outward and said retaining means and opening stretch over the enlarged section during assembly whereby yieldability of both the lug and the retainer means is effective in permitting snap-fit assembly thereof.

15. The combination flower pot and tray of claim 12 wherein said socket extends upwardly from the bottom wall of the pot into the pot and said lug extends upwardly from the bottom wall of said tray whereby both the pot and the tray can be placed on a flat horizontal surface without the socket or the lug striking said horizontal surface and thereby interfering with the stable support thereof on said horizontal surface.

16. The combination of any of the foregoing claims wherein said retaining means comprises a plurality of circumferentially spaced apart centrally directed tabs.

* * * * *